(No Model.) 2 Sheets—Sheet 2.

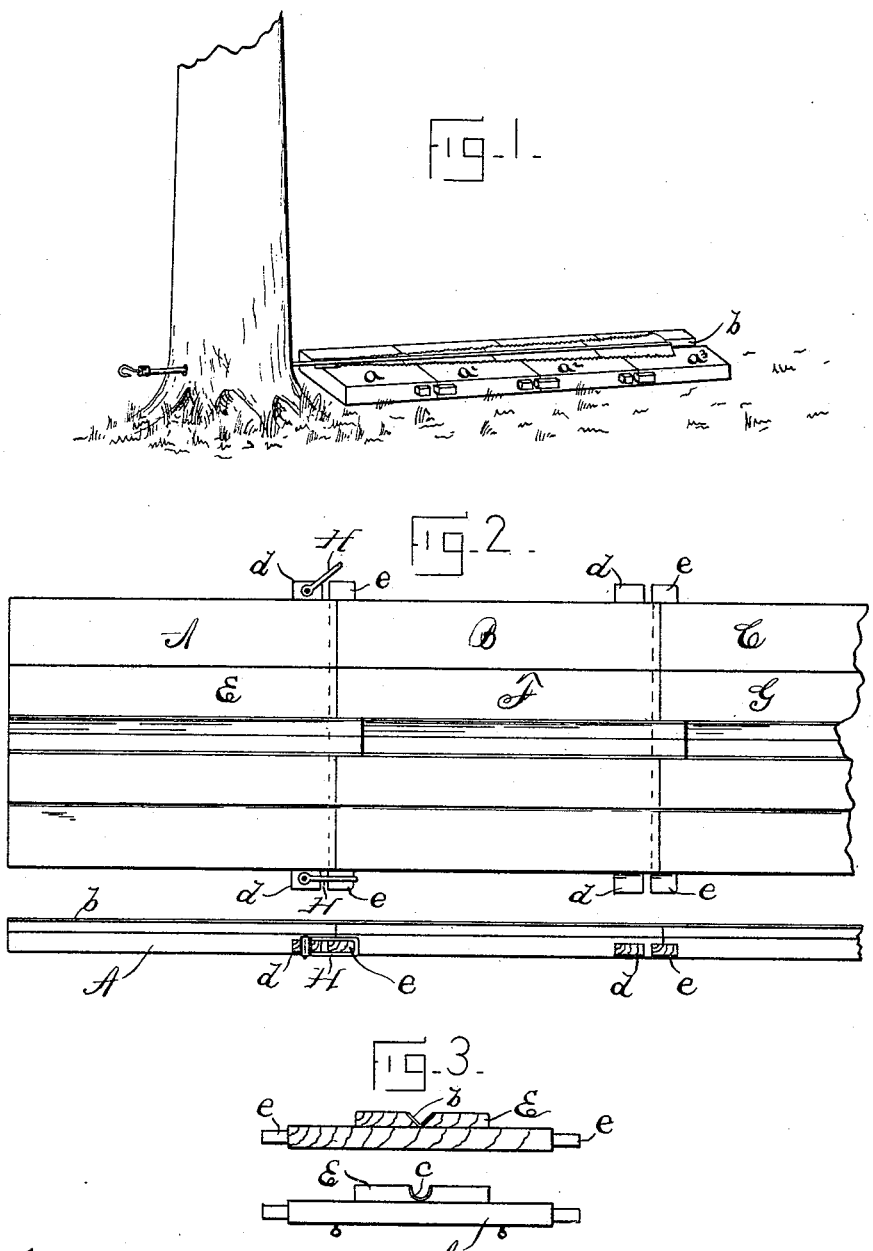

P. MILLER.
GUIDE TRACK FOR SAWS.

No. 332,273. Patented Dec. 15, 1885.

Witnesses:
Tyler J. Howard
Amos A. Browning

Inventor:
Philip Miller
By his Attorney
Frank H. Allen

UNITED STATES PATENT OFFICE.

PHILIP MILLER, OF NORWICH, CONNECTICUT.

GUIDE-TRACK FOR SAWS.

SPECIFICATION forming part of Letters Patent No. 332,273, dated December 15, 1885.

Application filed May 23, 1885. Serial No. 166,471. (No model.)

*To all whom it may concern:*

Be it known that I, PHILIP MILLER, a citizen of the United States, residing at Norwich, in the county of New London and State of Connecticut, have invented certain new and useful Improvements in Guide - Tracks for Saws, which improvements are fully set forth and described in the following specification, reference being had to the accompanying two sheets of drawings.

My invention relates to a guide-track for supporting a form of saw described in Patent No. 306,850, issued to me October 21, 1884. Said saw, briefly described, consists of one or more tapered sections held together by a central longitudinal rod or backbone. The several sections of the saw have cutting-teeth on both edges, which, as the backbone is drawn through a hole bored through a tree, follow and cut a gradually-increasing depth of kerf until said saw is drawn completely through the tree. That part of the tree which remains uncut is then cut through with an ax, and the tree falls.

In the patent mentioned above I have shown and described a guide-block, F, secured to the tree and calculated to guide the saw as it enters the hole in said tree; but I find in practice a tendency on the part of the outer unsupported end of the saw to settle and cramp, and have therefore invented the guide-track which forms the present invention, and which I will proceed to describe.

Figure 4:
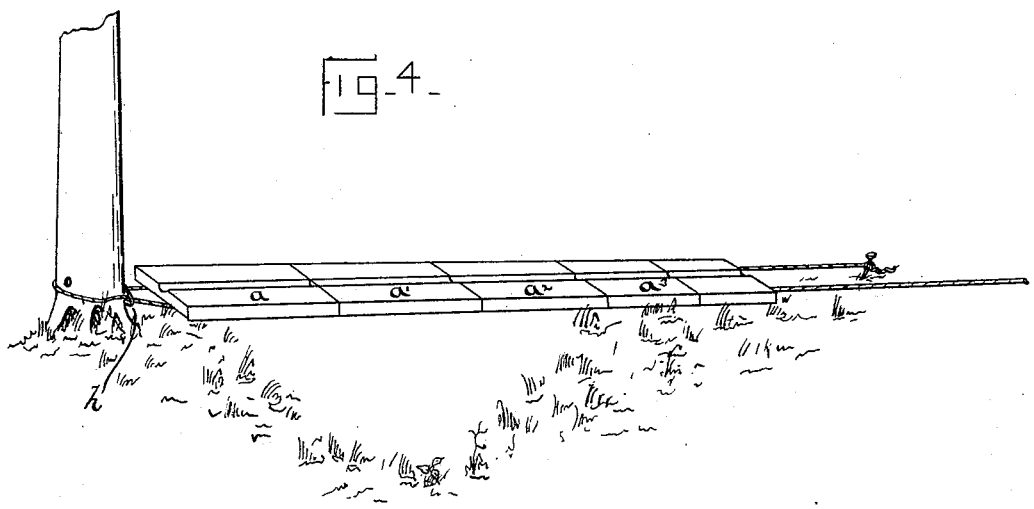
Figure 5:
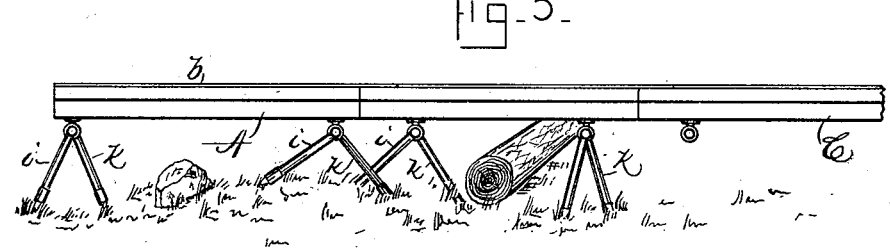

In the drawings hereunto annexed, Figure 1 represents the trunk of a standing tree having my tapered saw attached and ready to be drawn through to cut off said trunk, said saw being supported by my newly-invented guide-track. Fig. 2 shows enlarged top and edgewise views of several sections of said track, and Fig. 3 shows endwise views of the same. Fig. 4 illustrates a means by which I support said track over ravines, gulleys, streams, &c. Fig. 5 is a side elevation of said track having attached adjustable legs, by means of which I am able to level up said track on stony or uneven surfaces; and Fig. 6 is an end view of the track shown in Fig. 5.

Figure 6:
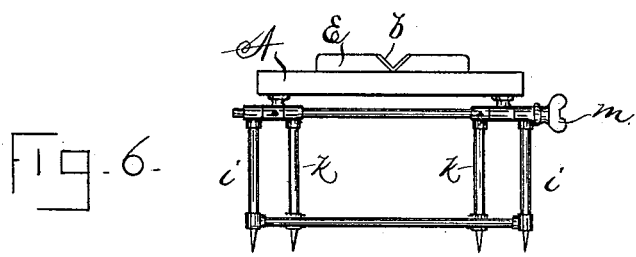

My guide-track is formed of several sections, $a$ $a'$ $a^2$, &c., which may be simply planks whose ends abut each other, the same being grooved longitudinally to receive the backbone of the saw, as shown in Fig. 1; but I prefer the form shown in Figs. 2, 3, and 6, as the track therein shown is less liable to wear out or warp out of shape. The bed of the last-named track is made of planks A B C, and on these planks are other narrower planks, E F G, which are bolted or screwed securely to the bed to stiffen the same. Planks E F G are grooved longitudinally to receive an angle-iron, $b$; or, if preferred, a grooved iron, $c$, of semicircular shape in cross-section may be used. When the several sections are properly assembled and adjusted, the backbone of the saw rests in said angle-iron and the blades of the saw rest on the planks E F G. At the abutting ends of the several sections are cleats $d$ $e$, whose ends extend outward a considerable distance, as shown, and in one of said ends is pivoted a shackle, H, whose free portions are adapted to be swung over the end of cleat $e$, as shown in Figs. 2 and 3, thus forming a simple, strong, and quickly - operated locking device. The cleat $e$ extends, preferably, beyond the end of the sections to which it is secured, forming a ledge, on which the next adjoining section rests, and the end of the angle-iron also laps onto the next section. (See Fig. 2.) By thus arranging overlapping ends the several sections are leveled and lined up much easier than if the ends simply abutted.

In places where it becomes necessary to locate the guide-track over a ravine or stream I have provided a rope, as shown in Fig. 4, by means of which I am able to level said track much quicker than I could possibly do with blocking, and I find the rope both cheap to provide and easy to carry from place to place. Said rope is secured at one end to a tree or stake, and is then carried across the ravine, around the tree to be sawed, and back to the starting-point. A link, $h$, is now placed around the rope between the tree and track, (see Fig. 4,) and the rope is drawn taut by any suitable mechanism and secured. The sectional guide-track is then placed on said rope, being held in place, when necessary, by eyebolts or pins through which the rope passes.

It is my purpose when cutting down a number of trees to have two or more complete guide-tracks, so that while one gang of men are at work making the necessary connections and sawing through a tree another gang may be boring a hole through the tree to be next sawed and getting a guide-track in proper position to receive the saw. One of these tracks I propose to make substantially as shown in Figs. 5 and 6, so that it may be supported in an elevated position to avoid stones, logs, and uneven ground. Each section of said track has at each end legs $i$ $k$, which I make preferably of iron pipe and common T connecting-joints, thus obtaining great strength and extreme lightness. When one pair of legs has been adjusted to the desired height, a thumb-screw, $m$, is turned home to hold said legs while adjusting the other legs of the series.

Having thus described my invention, I claim—

1. A guide-track for saws of the class herein referred to, consisting of two or more sections detachably connected to each other and having a groove or channel formed through the longitudinal center of the complete track, substantially as described, and for the object set forth.

2. In combination with a guide-track formed of sections detachably connected to each other, an angle-iron or metallic groove formed in sections and secured to said sectional track in its longitudinal center, said metallic groove being extended at one end to overlap the track-section next adjoining, as herein described, and for the object specified.

3. As a support for guide-tracks of the class herein referred to, and in combination with such a track, a rope whose ends are so secured that a double support is formed extending outward from the tree to be cut, on which support the guide-track may be suspended, substantially as described.

4. In combination with a guide-track formed of a series of sections detachably connected to each other and grooved throughout its longitudinal center, a series of legs hinged to said track and capable of adjustment to uneven surfaces, as herein described.

PHILIP MILLER.

Witnesses:
FRANK H. ALLEN,
TYLER J. HOWARD.